US009464892B2

(12) United States Patent
Harrill et al.

(10) Patent No.: US 9,464,892 B2
(45) Date of Patent: Oct. 11, 2016

(54) VEHICLE INTEGRATED WHEEL ALIGNMENT MONITORING SYSTEM

(71) Applicant: Mitchell C. Harrill, Rossville, GA (US)

(72) Inventors: Mitchell C. Harrill, Rossville, GA (US); Elena Harrill, Rossville, GA (US)

(*) Notice: Subject to any disclaimer, the term of this patent is extended or adjusted under 35 U.S.C. 154(b) by 241 days.

(21) Appl. No.: 13/746,890

(22) Filed: Jan. 22, 2013

(65) Prior Publication Data

US 2013/0190969 A1 Jul. 25, 2013

Related U.S. Application Data

(60) Provisional application No. 61/632,225, filed on Jan. 21, 2012.

(51) Int. Cl.
*G01B 21/26* (2006.01)

(52) U.S. Cl.
CPC ....... *G01B 21/26* (2013.01); *B60G 2200/4622* (2013.01); *G01B 2210/26* (2013.01)

(58) Field of Classification Search
CPC .............. G01B 21/26; G01B 2210/16; G01B 2210/20; G01B 2210/26
USPC ..................... 701/34.4; 280/86.75, 5.5, 5.514
See application file for complete search history.

(56) References Cited

U.S. PATENT DOCUMENTS

| | | | | |
|---|---|---|---|---|
| 2,077,082 A * | 4/1937 | Wedlake | ........................ | 33/337 |
| 3,597,728 A * | 8/1971 | Kurtz | ........................... | 340/438 |
| 4,835,714 A * | 5/1989 | Sano et al. | .................... | 700/279 |
| 4,905,783 A * | 3/1990 | Bober | .......................... | 180/422 |
| 5,060,959 A * | 10/1991 | Davis et al. | ............... | 280/5.514 |
| 5,269,186 A * | 12/1993 | Yopp | ............................. | 73/457 |
| 5,311,668 A * | 5/1994 | Longa et al. | .............. | 33/203.18 |
| 5,513,439 A * | 5/1996 | Brauer et al. | .............. | 33/203.18 |
| 5,557,525 A * | 9/1996 | Miichi et al. | ................ | 701/33.4 |
| 5,561,244 A * | 10/1996 | Olesky et al. | .................. | 73/146 |
| 5,781,286 A * | 7/1998 | Knestel | ..................... | 356/139.09 |
| 5,839,749 A * | 11/1998 | Lyu | ........................... | 280/86.753 |
| 6,405,109 B1 * | 6/2002 | Kyrtsos | ................ | G01M 17/02 701/33.9 |
| 6,490,800 B1 * | 12/2002 | Skagerlund | ........ | G01B 11/2755 33/203 |
| 6,512,968 B1 * | 1/2003 | de Bellefeuille | .... | G01B 11/275 701/34.3 |
| 6,962,356 B2 * | 11/2005 | Kwon | ........................ | 280/86.75 |
| 7,239,949 B2 * | 7/2007 | Lu et al. | ........................ | 701/45 |
| 7,581,324 B1 * | 9/2009 | Rogers | ............................ | 33/203 |
| 8,515,620 B2 * | 8/2013 | Ketteler | ................ | B60G 7/006 280/124.1 |
| 2002/0018218 A1 * | 2/2002 | Conheady et al. | .......... | 356/602 |

(Continued)

*Primary Examiner* — Helal A Algahaim
*Assistant Examiner* — Donald J Wallace

(57) ABSTRACT

A vehicle integrated wheel alignment monitoring system for monitoring and testing a dynamic roadwheel for misalignment as the vehicle is being operated. The monitoring system includes a synchronous position sensing apparatus and a synchronous verifier device for initiating a test for roadwheel misalignment at the time and position that a predetermined vehicle body height position is achieved during a suspension stroke and subsequently deactivating the test when the predetermined vehicle body height position is surpassed. The test includes determining if a predetermined roadwheel alignment value is in synchronization relative to the predetermined vehicle body height position at the time and position that the predetermined vehicle body height position is achieved. Detecting an in sync condition represents proper roadwheel alignment and detecting an out of sync condition represents roadwheel misalignment. In this manner, roadwheel positions above or below the predetermined vehicle body height position can be disregarded as roadwheel alignment factors.

14 Claims, 4 Drawing Sheets

(56) References Cited

U.S. PATENT DOCUMENTS

| | | | |
|---|---|---|---|
| 2004/0016309 A1* | 1/2004 | Catala Garcia et al. | 73/865.9 |
| 2005/0041239 A1* | 2/2005 | Healy | 356/139.09 |
| 2006/0107538 A1* | 5/2006 | Harrill | B60G 17/019 33/203.18 |
| 2007/0235969 A1* | 10/2007 | Harrill | B60G 7/006 280/86.75 |

* cited by examiner

VEHICLE INTEGRATED WHEEL ALIGNMENT MONITORING SYSTEM

CROSS-REFERENCE TO RELATED APPLICATION

This application under 37 C.F.R. 1.7 (b) claims priority to U.S. Provisional Patent Application No. 61/632,225 filed on Jan. 21, 2012, which is incorporated by reference herein in its entirety

FEDERALLY SPONSORED RESEARCH

Not Applicable

SEQUENCE LISTING OR PROGRAM

Not Applicable

BACKGROUND OF THE INVENTION

1. Technical Field

The present invention generally relates to detecting roadwheel misalignment as a vehicle is being operated or driven, and more particularly relates to a vehicle integrated wheel alignment monitoring and alignment system.

2. Description of Related Art

In the automotive and trucking industry, it is known that roadwheel misalignment decreases safety through poor vehicle handling, especially on wet or uneven road surfaces; creates driver fatigue when driving long distances; increases tire tread wear and vehicle fuel consumption, which increases vehicle operating cost. A long-standing problem has existed with prior devices designed to detect roadwheel misalignment during vehicle motion. In general, prior devices detect misalignment of a vehicle's roadwheel by detecting either displacement or torque experienced by a steering or roadwheel component. However, a problem arises from inherent displacement of steering and roadwheel components during vehicle motion due to loads or forces experienced by a tire, steering component, suspension component, and drive axle. Such displacement can interfere with identifying misalignment by creating a false appearance of roadwheel misalignment even though the roadwheels are properly aligned. This is especially true if the inherent displacement causes a prolonged self steer event, where the vehicle's driver has to apply a counter steer input or torque on the steering wheel when driving in a straight line. A self steer condition can be associated with: (i) a bump steer or roll steer effect caused by the suspension's geometry; or (ii) a deflection steer caused by twisting of rubber suspension bushings during vehicle acceleration and braking; or (iii) a steering pull during straight line driving caused by tire ply steer, mismatched tires, low tire pressure, memory steer, engine torque steer, load distribution, or road crown. Therefore, based on the foregoing, there is still a clear need in this field for a vehicle integrated wheel alignment monitoring system.

BRIEF SUMMARY OF THE INVENTION

The present invention solves the aforementioned problem associated with inherent displacement of steering and roadwheel components experienced during vehicle motion. The present invention is an apparatus installed on a vehicle for testing and monitoring a roadwheel for misalignment as the vehicle is being operated or driven. The present invention includes a synchronous position sensing apparatus and a synchronous verifier device for testing a predetermined synchronized relationship between at least: a predetermined vehicle body height position and a predetermined roadwheel alignment value, wherein detecting the predetermined synchronized relationship represents proper roadwheel alignment; and detecting an out of sync condition represents roadwheel misalignment. The synchronous verifier device may impart this information to either a display or audio feature in the vehicle's passenger compartment. The present invention may further include an onboard wheel alignment actuator for realigning a misaligned roadwheel.

The primary objective of the present invention is to provide an apparatus for implementing inventive method steps for determining if a vehicle's roadwheel is misaligned during vehicle operation. These steps include initiating a test for roadwheel misalignment at the time and position that a predetermined vehicle body height position is achieved during a suspension stroke, wherein the test determines if a predetermined synchronized relationship between a predetermined vehicle body height position and a predetermined roadwheel alignment value is in synchronization or out of synchronization at the time and position that the predetermined vehicle body height position is achieved, and the test is subsequently deactivated when the predetermined vehicle body height position is surpassed. If the roadwheel is steerable, a predetermined steering gear position of the vehicle's steering system is tested for synchronization relative to both the predetermined vehicle body height position and predetermined roadwheel alignment value. In this manner, dynamic roadwheel positions that are located above or below the predetermined vehicle body height position can be disregarded as roadwheel alignment factors, since these roadwheel positions can be associated with the aforementioned inherent displacement of steering and roadwheel components.

According to one aspect, the present invention may include mechanically operated position sensing elements, e.g., angular and/or rotary position sensing elements operated by appropriate connecting rods and other hardware. Alternatively, the present invention may include non-contact position sensing elements using Time of Flight (TOF) principles, e.g., ultrasonic, radar or Time Domain Reflectometry (guided radar) such as Ultra-Wideband (UWB) or other suitable wavelength measurement device. Furthermore, a switch, a photoelectric sensor or triangulation of position sensing elements may be used for activating and deactivating the aforementioned test.

According to one aspect, before calibrating the present invention, each roadwheel being monitored should be pre-aligned and the present invention installed in the appropriate location on the vehicle. During calibration, a preferred position of the vehicle's roadwheel and body height is not necessary, since the present invention will monitor the position of the roadwheel and body height according to the positions that were present at the time of calibration. Accordingly, the synchronous verifier device receive signals from the position sensing elements, during which the synchronous verifier device may activate a zero setting function for calibrating the signals to concurrent zero values as the vehicle is stationary or in motion.

According to another aspect of the present invention, switches may be included which allow alignment testing to be performed only during cruise control and coasting events. In this manner, torque related issues caused by deflection steer can be avoided. These switches may be selected from a cruise control switch, accelerator pedal switch and brake pedal switch.

TERMS AND DEFINITIONS

A position sensing element is defined as: a switch or a position sensor that permits position location or measurement. It may be either linear or angular and have contact or non-contact capability.

A predetermined roadwheel alignment value is defined as: a predetermined value applied to a preselected parameter that relates to a roadwheel. The parameter may include a predetermined toe angle, thrust angle, camber angle or scrub radius. The predetermined alignment value may include a plus or minus tolerance or threshold relating to a qualitative value (as in position) or a quantitative value (as in numeric).

A predetermined vehicle body height position is defined as: a predetermined height at which a vehicle's sprung components are positioned over the vehicle's un-sprung components during a suspension stroke. This position may include a vehicle's ride height; however the predetermined vehicle body height position can be synchronized relative to the aforementioned predetermined roadwheel alignment value at positions other than the vehicle's ride height. The predetermined vehicle body height position may include a plus or minus tolerance or threshold relating to a qualitative value (as in position) or a quantitative value (as in numeric).

A predetermined steering gear position is defined as: a predetermined direction or position or angle that relates to a steering gear of a vehicle's steering system, which may include a plus or minus tolerance or threshold relating to a qualitative value (as in position) or a quantitative value (as in numeric).

A synchronous verifier device is defined as: device for receiving a signal from one or more position sensing elements for monitoring, testing and confirming existence of an in sync or out of sync condition between the position sensing elements. The synchronous verifier device may be a switch, electric circuit, signal processor or other suitable device configured for verifying synchronization.

A suspension stroke is defined as: compression or expansion of a vehicle's spring.

DETAILED DESCRIPTION OF THE PREFERRED EMBODIMENTS

Testing a Steerable Roadwheel for Misalignment

Figure 1A:
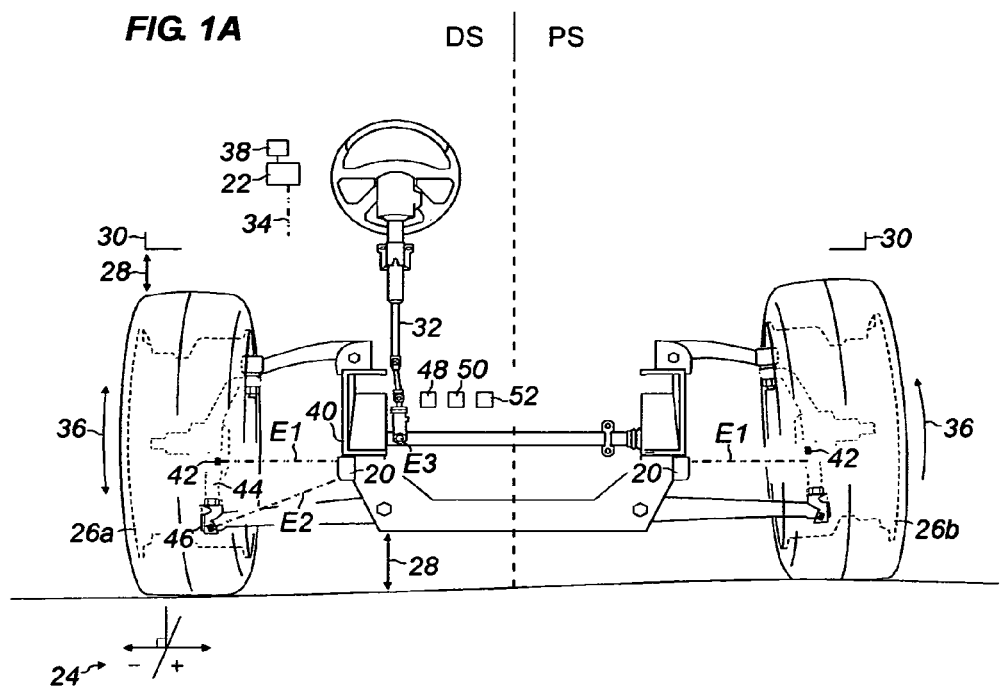
FIG. 1a shows the present invention mounted on the vehicle in an operable configuration for testing a steerable roadwheel for misalignment during vehicle motion.

FIG. 1a shows one example embodiment considered to be a best mode of the present invention for testing a steerable roadwheel for misalignment during vehicle motion. The vehicle illustration is shown divided into a driver side (DS) and a passenger side (PS), which is indicated at the top of the illustration. Referring now to the driver side DS, the present invention includes a synchronous position sensing apparatus 20 (associated with position sensing elements E1 and E2) mounted at vehicle frame, body or crossmember 40, and a position sensing element E3 (associated with a steering gear position of steering system 32), and an on-vehicle synchronous verifier device 22. These devices are for testing a predetermined synchronized relationship between: (i) a predetermined vehicle body height position 28 of vehicle 30 via position sensing element E1, and (ii) a predetermined roadwheel alignment value 24 of roadwheel 26a via position sensing element E2, and (iii) a predetermined steering gear position of the vehicle's steering system 32 via position sensing element E3.

Accordingly, during suspension stroke 36, predetermined vehicle body height position 28 will be achieved when position sensing element E1 of synchronous apparatus 20 comes in communication with a predetermined intersecting point 42 at wheel knuckle 44 (used as a switch). At this moment, if predetermined steering gear position (via element E3) is also achieved, then signal 34 from element E1 and/or E3 is received by synchronous verifier 22, which initiates a test to determine if the predetermined roadwheel alignment value (via element E2 in communication with predetermined intersecting point 46) is in synchronization or out of synchronization relative to both elements E1 and E3. The test is subsequently discontinued (via element E1 being out of communication with intersecting point 42) after predetermined vehicle body height position 28 is surpassed.

The aforementioned predetermined roadwheel alignment value 24 may represent, for example, a predetermined toe angle of roadwheel 26a. By having intersecting point 46 relative to the lower steering pivot of wheel knuckle 44 prevents detecting interrelated positions between the toe angle and a camber angle of roadwheel 26a. If needed a bolt on intersecting point 46 can be used.

Synchronous verifier 22 may include either a display or audio feature, which provides communication event 38 for imparting information based on test results to the vehicle's driver. The display information may include a text message, light or pictogram or other suitable notification. Synchronous verifier 22 may also send this information to a remote wireless receiver or a remote diagnostic tool (not shown).

Steerable roadwheel 26a is considered properly aligned when position sensing elements E1, E2 and E3 are tested and found concurrent at the time and position that the predetermined vehicle body height position (via element E1) and the predetermined steering gear position (via element E3) are concurrently achieved during suspension stroke 36. Misalignment of steerable roadwheel 26a is determined via synchronous verifier 22 when the predetermined roadwheel alignment value (via element E2) becomes out of synchronization relative to both the predetermined vehicle body height position (via element E1) and the predetermined steering gear position (via element E3).

With respect to the predetermined roadwheel alignment value 24, this value may represent a predetermined toe angle, thrust angle, scrub radius or camber angle.

In reference to the predetermined toe or thrust angle, these parameters relate to the direction that the roadwheel is tracking. Detecting a change in the aforementioned predetermined synchronized relationship will represent misalignment of the toe or thrust angle.

In reference to the predetermined scrub radius, this parameter relates to directional movement of the toe angle when the vehicle is driven from a reverse direction to a forward direction relative to a predetermined vehicle body height position during suspension stroke 36. The amount of directional change in the predetermined synchronized relationship when the vehicle is driven from a reverse direction to a forward direction determines a positive, zero or negative scrub radius, which is based on the direction and amount of change. A change in this determination during vehicle operation represents an incorrect scrub radius.

With respect to the predetermined camber angle, this parameter relates to the inward or outward tilt of roadwheel 26a from a vertical position relative to the vehicle. A change in this determination when the predetermined vehicle body height position is achieved during suspension stroke 36 represents an incorrect camber angle.

Referring now to the passenger side PS of the vehicle illustration of FIG. 1a. Roadwheel 26b is shown in a compressed state relative to vehicle 30 during suspension stroke 36. Position sensing element E1 may control deactivation or switching off of the aforementioned test when position sensing element E1 is no longer in communication with predetermined intersecting point 42 during suspension stroke 36. In this manner, dynamic roadwheel positions that are located above or below the predetermined vehicle body height position can be disregarded as roadwheel alignment factors, since these roadwheel positions can be associated with the aforementioned inherent displacement of steering and roadwheel components.

In Addition, at least two switches such as a brake pedal switch 48 in combination with accelerator pedal switch 50 or cruise control switch 52 may be included for avoiding (during alignment testing) torque related issues associated with the aforementioned deflection steer. For example, these switches can be concurrently closed during cruise control and coasting events when no brake is applied. In this manner, torque from acceleration and braking that displaces components can be avoided.

Figure 1B:
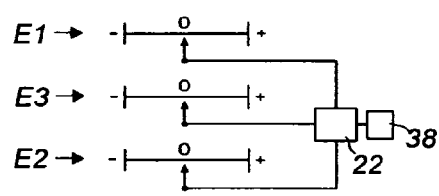
FIG. 1b shows sensing elements of the present invention calibrated to a predetermined synchronized relationship, representing proper alignment of a steerable roadwheel.

FIG. 1b shows a calibrated synchronized relationship between position sensing elements E1, E2 and E3, which represents a predetermined synchronized relationship between a predetermined vehicle body height position (via element E1), a predetermined roadwheel alignment value (via element E2), and a predetermined steering gear position (via element E3). The zeros depicted can be positional values and/or numeric values. These values are set, tested, and verified by synchronous verifier 22. Synchronous verifier device 22 provides communication event 38 imparting information based on the synchronized relationship. The depicted predetermined synchronized relationship represents proper alignment of a steerable roadwheel.

Figure 1C:
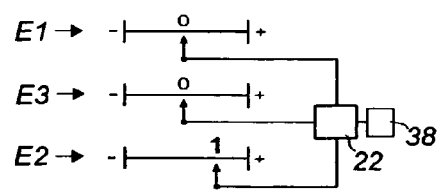
FIG. 1c shows position sensing elements of the present invention in an out of sync condition, representing misalignment of a steerable roadwheel.

FIG. 1c shows an out of sync condition detected between the position sensing elements of FIG. 1b. Where element E2 (representing the predetermined roadwheel alignment value) is no longer concurrent relative to both element E1 (representing the predetermined vehicle body height position) and element E3 (representing the predetermined steering gear position). These out of sync values are verified by synchronous verifier device 22, wherein synchronous verifier 22 provides communication event 38, which imparts information based on the out of sync condition. The out of sync condition represents misalignment of a steerable roadwheel.

Figure 1D:
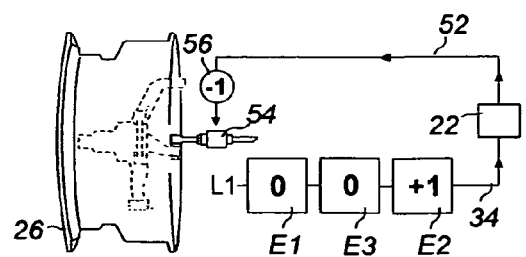
FIG. 1d shows how a misaligned steerable roadwheel may be adjusted during vehicle motion.

FIG. 1d shows an example embodiment of the present invention for realigning a misaligned steerable roadwheel during vehicle operation. For example, line L1 supplies current to position sensing elements E1, E2 and E3, wherein position signal 34 from at least one of the position sensing elements is received by synchronous verifier 22. If signal 34 reveals that position sensing element E2 is out of synchronization by a specific numeric amount (e.g., a positive one percent misalignment value as shown at element E2) relative to both element E1 and element E3, then synchronous verifier 22 provides a communication event relating to output signal 52, which controls wheel alignment actuator 54 in a reverse manner by a value equal to the misalignment value (e.g., a negative one percent value 56). In this manner, roadwheel 20 can be realigned during vehicle motion without further input from position sensing elements E1, E2 or E3.

Figure 2A:
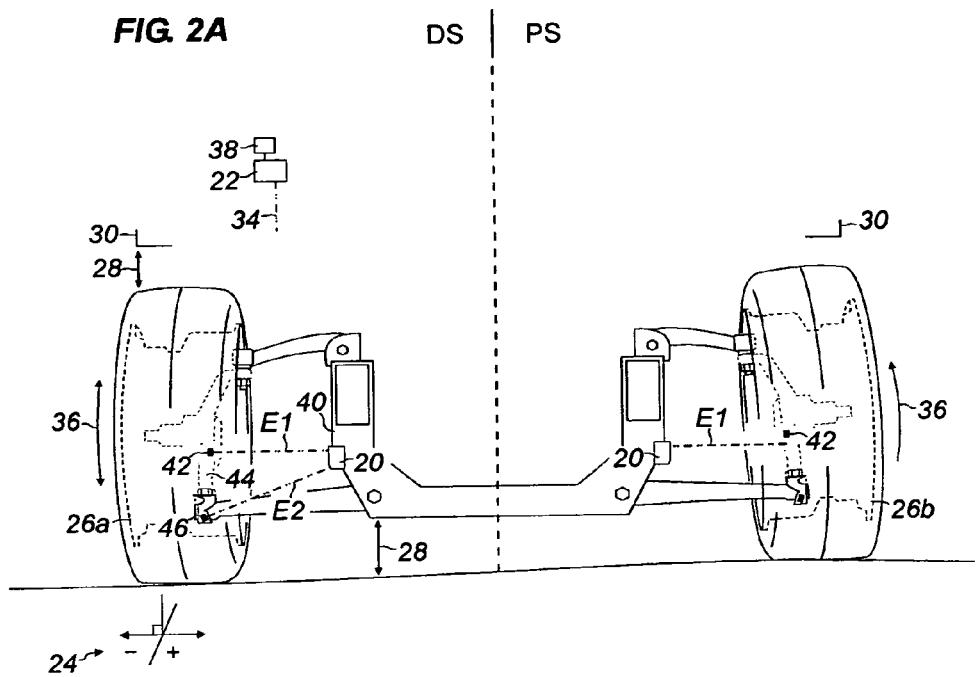
FIG. 2a shows the present invention mounted on the vehicle in an operable configuration for testing a non-steerable roadwheel for misalignment during vehicle motion.

Testing a Non-Steerable Roadwheel for Misalignment:

FIG. 2a shows one example embodiment considered to be a best mode of the present invention for testing a non-steerable roadwheel for misalignment during vehicle motion. The vehicle illustration is shown divided into a driver side (DS) and a passenger side (PS), which is indicated at the top of the illustration. Referring now to the driver side DS, the present invention includes a synchronous position sensing apparatus 20 (associated with position sensing elements E1 and E2) mounted at vehicle frame, body or crossmember 40 and an on-vehicle synchronous verifier device 22. These devices are for testing a predetermined synchronized relationship between a predetermined vehicle body height position 28 of vehicle 30 via position sensing element E1 and a predetermined roadwheel alignment value 24 of roadwheel 26a via position sensing element E2.

Accordingly, during suspension stroke 36, predetermined vehicle body height position 28 will be achieved when position sensing element E1 of synchronous apparatus 20 comes in communication with a predetermined intersecting point 42 at wheel knuckle 44 (used as a switch). At this moment, signal 34 from element E1 is received by synchronous verifier 22, which initiates a test to determine if the predetermined roadwheel alignment value (via element E2 in communication with predetermined intersecting point 46) is in synchronization or out of synchronization relative to element E1. The test is subsequently discontinued (via element E1 being out of communication with intersecting point 42) after predetermined vehicle body height position 28 is surpassed.

The aforementioned predetermined roadwheel alignment value 24 may represent, for example, a predetermined toe angle of roadwheel 26a. By having intersecting point 46 relative to the lower steering pivot of wheel knuckle 44 prevents detecting interrelated positions between the toe angle and a camber angle of roadwheel 26a. If needed a bolt on intersecting point 46 can be used.

Synchronous verifier 22 may include either a display or audio feature, which provides communication event 38 for imparting information based on test results to the vehicle's driver. Synchronous verifier 22 may also send this information to a remote wireless receiver or a remote diagnostic tool.

Non-steerable roadwheel 26a is considered properly aligned when position sensing elements E1 and E2 are tested and found concurrent at the time and position that the predetermined vehicle body height position (via element E1) is achieved during suspension stroke 36. The test is subsequently discontinued (via element E1) after the predetermined vehicle body height position 28 is surpassed. Misalignment of non-steerable roadwheel 26a is determined via synchronous verifier 22 when the predetermined roadwheel alignment value (via element E2) becomes out of synchronization relative to the predetermined vehicle body height position (via element E1).

Referring now to the passenger side PS of the vehicle illustration of FIG. 2a. Roadwheel 26b is shown in a compressed state relative to vehicle 30 during suspension stroke 36. Position sensing element E1 may control deactivation or switching off of the aforementioned test when position sensing element E1 is no longer in communication with predetermined intersecting point 42 during suspension stroke 36. In this manner, dynamic roadwheel positions that are located above or below the predetermined vehicle body height position can be disregarded as roadwheel alignment factors, since these roadwheel positions can be associated with the aforementioned inherent displacement of steering and roadwheel components.

Figure 2B:
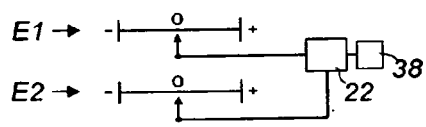
FIG. 2b shows sensing elements of the present invention calibrated to a predetermined synchronized relationship, representing proper alignment of a non-steerable roadwheel.

FIG. 2b shows a calibrated synchronized relationship between position sensing elements E1 and E2, which represents a predetermined synchronized relationship between a predetermined vehicle body height position (via element E1) and a predetermined roadwheel alignment value (via element E2). The zeros depicted can be positional values and/or numeric values. These values are set, tested, and verified by synchronous verifier 22. Synchronous verifier device 22 provides communication event 38 imparting information based on the synchronized relationship. The depicted predetermined synchronized relationship represents proper alignment of a non-steerable roadwheel.

Figure 2C:
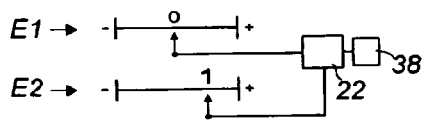
FIG. 2c shows position sensing elements of the present invention in an out of sync condition, representing misalignment of a non-steerable roadwheel.

FIG. 2c shows an out of sync condition detected between the position sensing elements of FIG. 2b. Where element E2 (representing the predetermined roadwheel alignment value) is no longer concurrent relative to element E1 (representing the predetermined vehicle body height position). These out of sync values are verified by synchronous verifier device 22, wherein synchronous verifier 22 provides communication event 38, which imparts information based on the out of sync condition. The out of sync condition represents misalignment of a non-steerable roadwheel.

Figure 2D:
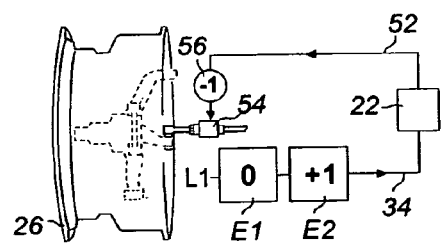
FIG. 2d shows how a misaligned non-steerable roadwheel may be adjusted during vehicle motion.

FIG. 2d shows an example embodiment of the present invention for realigning a misaligned non-steerable roadwheel during vehicle operation. For example, line L1 supplies current to position sensing elements E1 and E2, wherein position signal 34 from element E1 and/or E2 is received by synchronous verifier 22. If signal 34 reveals that position sensing element E2 is out of synchronization by a specific numeric amount (e.g., a positive one percent misalignment value as shown at E2) relative to element E1, then synchronous verifier 22 provides a communication event relating to output signal 52, which controls wheel alignment actuator 54 in a reverse manner by a value equal to the misalignment value (e.g., a negative one percent value 56). In this manner, roadwheel 20 can be realigned during vehicle motion without further input from position sensing elements E1 or E2.

Figure 3:
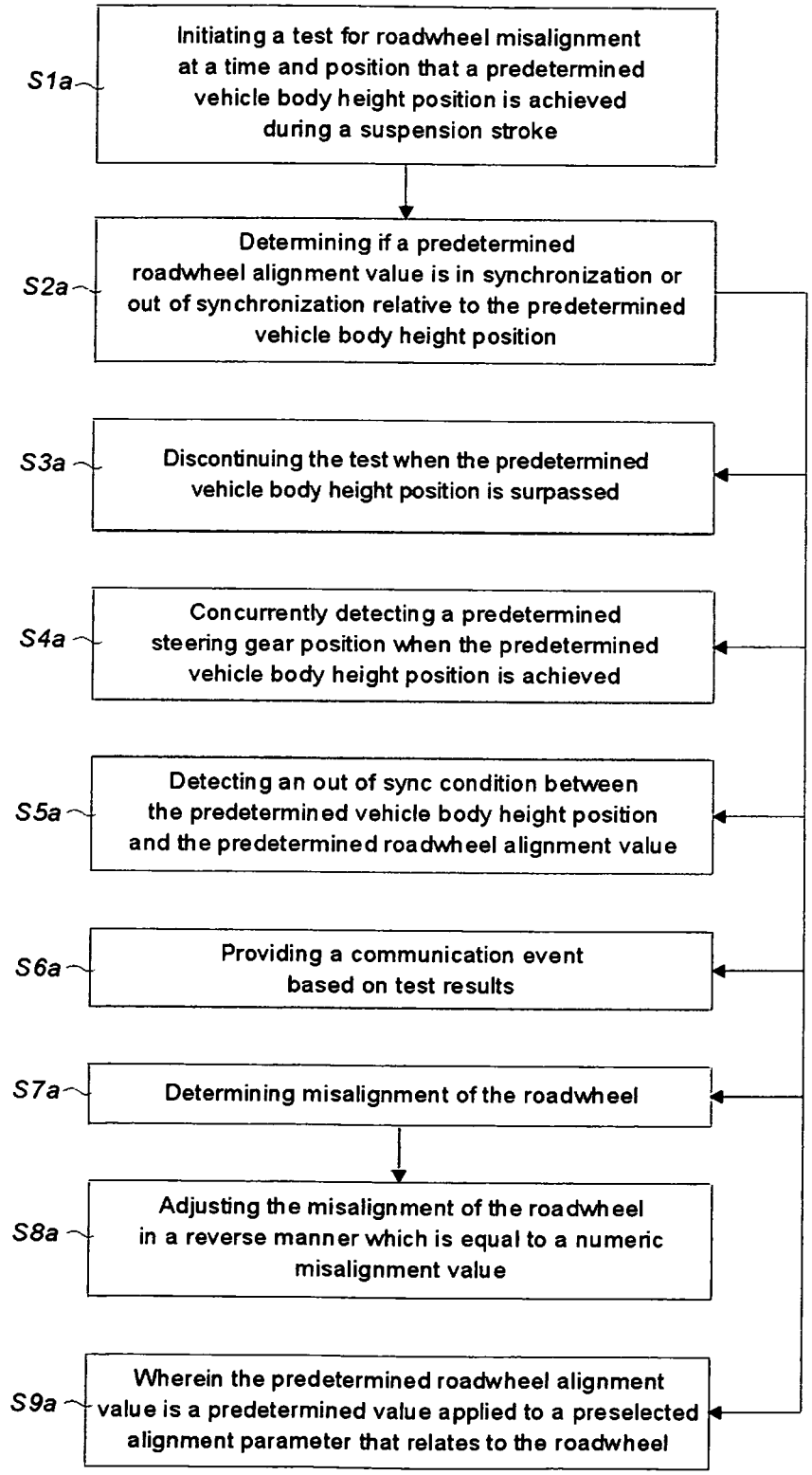
FIG. 3 shows method steps for determining if a vehicle's roadwheel is misaligned during vehicle motion.

FIG. 3 shows method steps for testing a vehicle's roadwheel for misalignment during a suspension stroke, implemented by an apparatus onboard the vehicle, comprising: step S1a, a step for initiating a test for roadwheel misalignment at a time and position that a predetermined vehicle body height position is achieved during a suspension stroke; step S2a, wherein the test determines if a predetermined roadwheel alignment value is in synchronization or out of synchronization relative to the predetermined vehicle body height position; step S3a, a step for discontinuing the test after the predetermined vehicle body height position is surpassed; step S4a, a step for concurrently detecting a predetermined steering gear position when the predetermined vehicle body height position is achieved; step S5a, a step for detecting an out of sync condition between the predetermined vehicle body height position and the predetermined roadwheel alignment value; step S6a, a step for providing a communication event based on test results; step S7a, a step for determining misalignment of the roadwheel; step S8a, a step for adjusting the misalignment of the roadwheel in a reverse manner which is equal to a misalignment numeric value; and step S9a, wherein the predetermined roadwheel alignment value is a predetermined value applied to a preselected alignment parameter that relates to the roadwheel.

Figure 4:
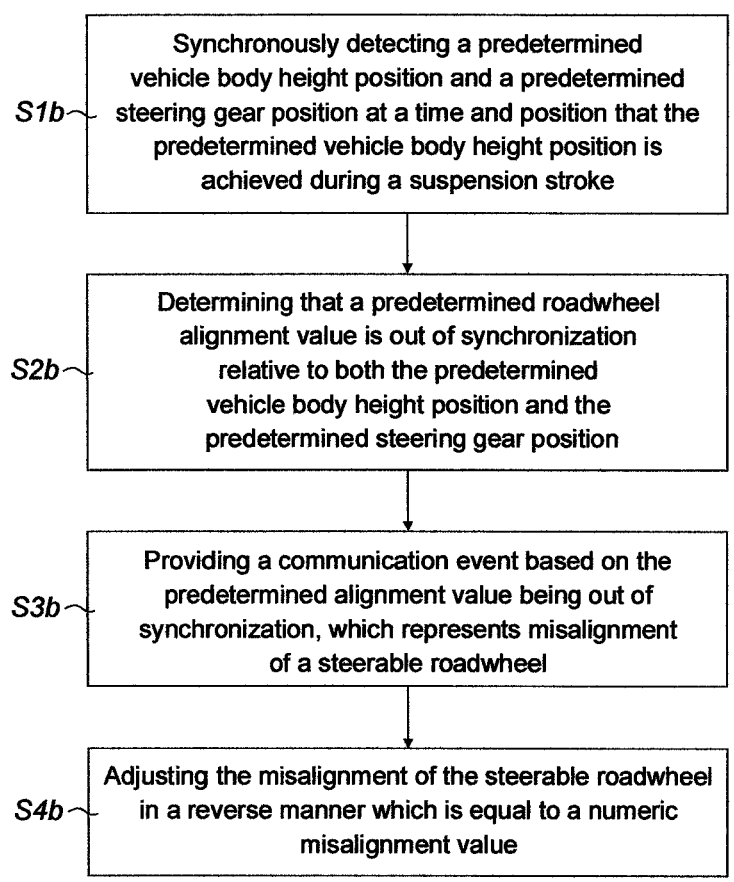
FIG. 4 shows method steps for detecting misalignment of a vehicle's steerable roadwheel.

FIG. 4 shows method steps for detecting misalignment of a steerable roadwheel during vehicle operation, implemented by an apparatus onboard the vehicle, comprising the steps of: step S1b, synchronously detecting a predetermined vehicle body height position and a predetermined steering gear position at a time and position the predetermined vehicle body height is achieved during a suspension stroke; step S2b, determining that a predetermined roadwheel alignment value is out of synchronization relative to both the predetermined vehicle body height position and the predetermined steering gear position; step S3b, providing a communication event based on the predetermined roadwheel alignment value being out of synchronization, which represents misalignment of a steerable roadwheel; and step S4b, adjusting the misalignment of the steerable roadwheel in a reverse manner which is equal to a numeric misalignment value.

It is understood that various alternatives, modifications, equivalents and configurations will become readily apparent to those skilled in the art from the issuing detailed description and drawings, all without departing from the scope of the present invention. Accordingly, the drawings and detailed description are for illustrative purposes only and do not limit the invention to the exact construction and operation illustrated and described. The appended claims are intended to cover all such alternatives, modifications, equivalents and configurations which fall within the true spirit and scope of the invention.

We claim:

1. A method for detecting misalignment of an underway vehicle's roadwheel, implemented by an apparatus on the vehicle, comprising the steps of:

providing a first position sensor in the vehicle suspension for detecting a body height position;

providing a second position sensor in the vehicle for detecting a roadwheel alignment position;

calibrating a predetermined roadwheel alignment position and a predetermined body height position to a synchronized relationship;

detecting an underway roadwheel alignment position in said vehicle while underway as said predetermined body height position is detected during a suspension stroke;

comparing said underway roadwheel alignment position with said predetermined roadwheel alignment position; and determining that said underway roadwheel alignment position does not match said predetermined roadwheel alignment position, representing an out of sync condition indicating a misalignment of said roadwheel.

2. The method according to claim 1, wherein said detecting an underway roadwheel alignment position is discontinued as said predetermined body height position is no longer detected.

3. The method according to claim 1, further comprising adjusting said roadwheel alignment position during vehicle motion to said predetermined roadwheel alignment position to synchronize with said predetermined body height position.

4. The method according to claim 1, wherein said calibrating to said synchronized relationship further includes synchronously calibrating said roadwheel alignment position, said body height position, and a predetermined steering gear position.

5. The method according to claim 4, further comprising adjusting said roadwheel position during vehicle motion so that said predetermined roadwheel alignment position synchronizes with both said predetermined body height position and said predetermined steering gear position.

6. The method according to claim 1, wherein said steps of detecting, comparing and determining occur during a vehicle cruise control event.

7. The method according to claim 1, wherein said steps of detecting, comparing and determining occur during a vehicle coasting event.

8. A method for detecting misalignment of an underway vehicle's roadwheel, implemented by an apparatus on the vehicle, comprising the steps of:

providing a first position sensor in the vehicle suspension for detecting a body height position;

providing a second position sensor in the vehicle for detecting a roadwheel alignment position;

calibrating a predetermined roadwheel alignment position and a predetermined body height position to a synchronized relationship;

detecting a body height position during a suspension stroke equal to said predetermined body height position, and responsively initiating detection of an underway roadwheel alignment position;

comparing said underway roadwheel alignment position with said predetermined roadwheel alignment position;

determining whether said underway roadwheel alignment position matches said predetermined roadwheel alignment position at the time that said predetermined body height position is detected;

detecting that said body height position during the suspension stroke is not equal to said predetermined body height position, and responsively ceasing said detection and comparing of said underway roadwheel alignment position with said predetermined roadwheel alignment position.

9. The method according to claim 8, further comprising adjusting said roadwheel alignment position during vehicle motion to said predetermined roadwheel alignment position to synchronize with said predetermined body height position.

10. The method according to claim 8, wherein said calibrating to said synchronized relationship further includes synchronously calibrating said roadwheel alignment position, said body height position, and a predetermined steering gear position.

11. The method according to claim 10, further comprising adjusting said roadwheel position during vehicle motion so that said predetermined roadwheel alignment position synchronizes with both said predetermined body height position and said predetermined steering gear position.

12. The method according to claim 8, wherein said steps of detecting, comparing and determining occur during a vehicle cruise control event.

13. The method according to claim 8, wherein said steps of detecting, comparing and determining occur during a vehicle coasting event.

14. An apparatus for determining misalignment of an underway vehicle's roadwheel, comprising:

means for initiating a test for misalignment of an underway vehicle's roadwheel in response to a predetermined body height position being detected during a suspension stroke;

means for detecting an underway roadwheel alignment position; and means for determining whether said underway roadwheel alignment position matches a predetermined roadwheel alignment position at the time that said predetermined body height position is detected during said suspension stroke.

* * * * *